US005689554A

United States Patent [19]
Fukazawa

[11] Patent Number: 5,689,554
[45] Date of Patent: Nov. 18, 1997

[54] INTERNETWORK COMMUNICATION SYSTEM FOR MANAGING SUBSCRIBER SWITCHES BETWEEN NETWORKS

[75] Inventor: Shigeru Fukazawa, Hino, Japan

[73] Assignee: Kabushiki Kaisha Toshiba, Kawasaki, Japan

[21] Appl. No.: 747,379

[22] Filed: Nov. 12, 1996

Related U.S. Application Data

[63] Continuation of Ser. No. 348,901, Nov. 25, 1994, abandoned, which is a continuation of Ser. No. 115,114, Sep. 2, 1993, abandoned.

[30] Foreign Application Priority Data

Sep. 4, 1992 [JP] Japan ............... 4-237320

[51] Int. Cl.$^6$ ................... H04M 7/00
[52] U.S. Cl. ............... 379/219; 379/60; 379/607; 379/220; 379/229; 379/211; 379/212; 379/269
[58] Field of Search ............. 379/33, 59, 60, 379/207, 201, 211, 212, 221, 220, 455, 219, 229, 230

[56] References Cited

U.S. PATENT DOCUMENTS

| | | | |
|---|---|---|---|
| 3,560,663 | 2/1971 | Lee | 379/196 |
| 4,829,554 | 5/1989 | Barnes | 379/63 |
| 4,833,702 | 5/1989 | Shitara et al. | 379/60 |
| 5,073,923 | 12/1991 | Offers | 379/159 |
| 5,185,741 | 2/1993 | Iguchi et al. | 379/219 |
| 5,212,822 | 5/1993 | Fukumine et al. | 379/60 |
| 5,255,307 | 10/1993 | Mizikovsky | 379/60 |
| 5,307,400 | 4/1994 | Sawyer | 379/60 |

*Primary Examiner*—Krista M. Zele
*Assistant Examiner*—Scott Wolinsky
*Attorney, Agent, or Firm*—Finnegan, Henderson, Farabow, Garrett & Dunner, L.L.P.

[57] ABSTRACT

A communication system in which a subscriber terminal moves between networks having different number plans. The moved subscriber terminal can receive the same service as that of the network from which the subscriber terminal has moved (movement originator network) without being conscious of the movement. In the system, when the subscriber terminal moves between the networks having the different number plans, the movement of the subscriber terminal is registered in the network to which the subscriber terminal has moved (movement destination network), data is exchanged with the movement originator network, an allocated number correlative table is prepared and stored in the movement destination network; while, a movement destination number correlative table is prepared and stored in the movement originator network. When the moved subscriber terminal issues a call to another network, call control is transferred from the movement destination network to the movement originator network on the basis of the allocated number correlative table and carried out in the movement originator network on the basis of the movement destination correlative table.

22 Claims, 5 Drawing Sheets

| SECOND NETWORK SUBSCRIBER NUMBER | FIRST NETWORK IDENTIFIER | FIRST NETWORK SUBSCRIBER NUMBER |
|---|---|---|
| 2000 | 10 | 1000 |

| FIRST NETWORK SUBSCRIBER NUMBER | SECOND NETWORK IDENTIFIER | SECOND NETWORK SUBSCRIBER NUMBER |
|---|---|---|
| 1000 | 20 | 2000 |

FIG.7

INTERNETWORK COMMUNICATION SYSTEM FOR MANAGING SUBSCRIBER SWITCHES BETWEEN NETWORKS

This application is a continuation of application Ser. No. 08/348,091 filed Nov. 25, 1994, now abandoned, which is a continuation of Ser. No. 08/115,114, filed Sep. 2, 1993, now abandoned.

BACKGROUND OF THE INVENTION

1. Field of the Invention

The present invention relates to communication systems which include respectively at least two networks having different number plans and more particularly, to a communication system which is so arranged that, when a subscriber terminal moves from one network to another, the moved subscriber terminal can issue a call from the network to which the terminal has moved without being aware of a number plan of that network to thereby improve the system operability.

2. Description of the Related Art

In a conventional communication system including a plurality of networks, each of the networks has an independent different number plan and is arranged to perform a switching service which is used exclusively for subscribers belonging to its own network.

Thus, one of subscribers belonging to one network can receive the switching service of its own network, but cannot receive switching services of other networks.

These years, portable mobile radio terminals have come into wide use and it has been considered to use a mobile radio terminal in a plurality of networks by moving the portable radio terminal among the plurality of networks. In this case, when a subscriber terminal belonging to one network moves to another network, so long as a new subscriber number is assigned to the moved subscriber terminal in a network to which the subscriber terminal has moved (hereinafter referred to "movement destination network"), the moved subscriber terminal can be used in the movement destination network.

However, since the networks have respectively independent different number plans, the subscriber terminal moved to another network can receive only a service according to a number plan of the movement destination network. For this reason, each time the subscriber terminal moves to another network, it is necessary for the system to examine and understand the number plan of the movement destination network.

Assume for example that, dialing of a number '0' enables a subscriber to receive the exchange service of a first network when issuing a call from that first network to a second network; while dialing of a number '9' enables the subscriber to receive the exchange service of the second network when issuing a call from that second network to another network. Then, when the subscriber terminal moves from that the first network to the second network, the subscriber cannot receive the exchange service of the second network, if the user does not know that dialing the number '9' enables the reception of the service of the second network.

In this way, when such application flexibility is considered that a subscriber terminal can be moved among a plurality of networks having different number plans, the subscriber terminal must know well the respective number plans of the networks for its effective use.

SUMMARY OF THE INVENTION

It is an object of the present invention to provide a communication system in which, even when a subscriber terminal moves among a plurality of networks having different number plans, the moved subscriber terminal can receive the service of the network to which the subscriber terminal has moved without being conscious of its movement.

In accordance with an aspect of the present invention, the above object is attained by providing a communication system which includes at least two networks having respectively different number plans, and in which, when a subscriber terminal belonging to one network moves to the other network, such movement is registered together with an identifier of a network from which the subscriber terminal has moved (hereinafter referred to "movement originator network") and a subscriber number of the moved subscriber terminal in the movement originator network, the movement destination network allocates a subscriber number to the moved subscriber terminal in response to the movement registration, creates and, stores therein an allocated number correlative table showing a relationship between the allocated subscriber number in the movement destination network and the identifier of the movement originator network and the subscriber number of the moved terminal in the movement originator network at the same time, informs from the movement destination network to the movement originator network the allocated subscriber number in the movement destination network and an identifier of the movement destination network; while, the movement originator network, when receiving the notification, prepares and stores therein a movement destination number correlative table showing a relationship between the informed subscriber number and the identifier of the movement destination network and the subscriber number in the movement originator network and, when the moved subscriber terminal issues a call from the movement destination network, call control is transferred from the movement destination network to the movement originator network on the basis of the allocated number correlative table for the movement originator network to perform the call control.

With such an arrangement, the moved subscriber terminal can receive the same service as that of the movement originator network even in the movement destination network without utterly noticing the number plan of the movement destination network only by issuing a call according to the number plan of the movement originator network, whereby its exchange service and the like can be improved.

DESCRIPTION OF THE PREFERRED EMBODIMENTS

Figure 1:
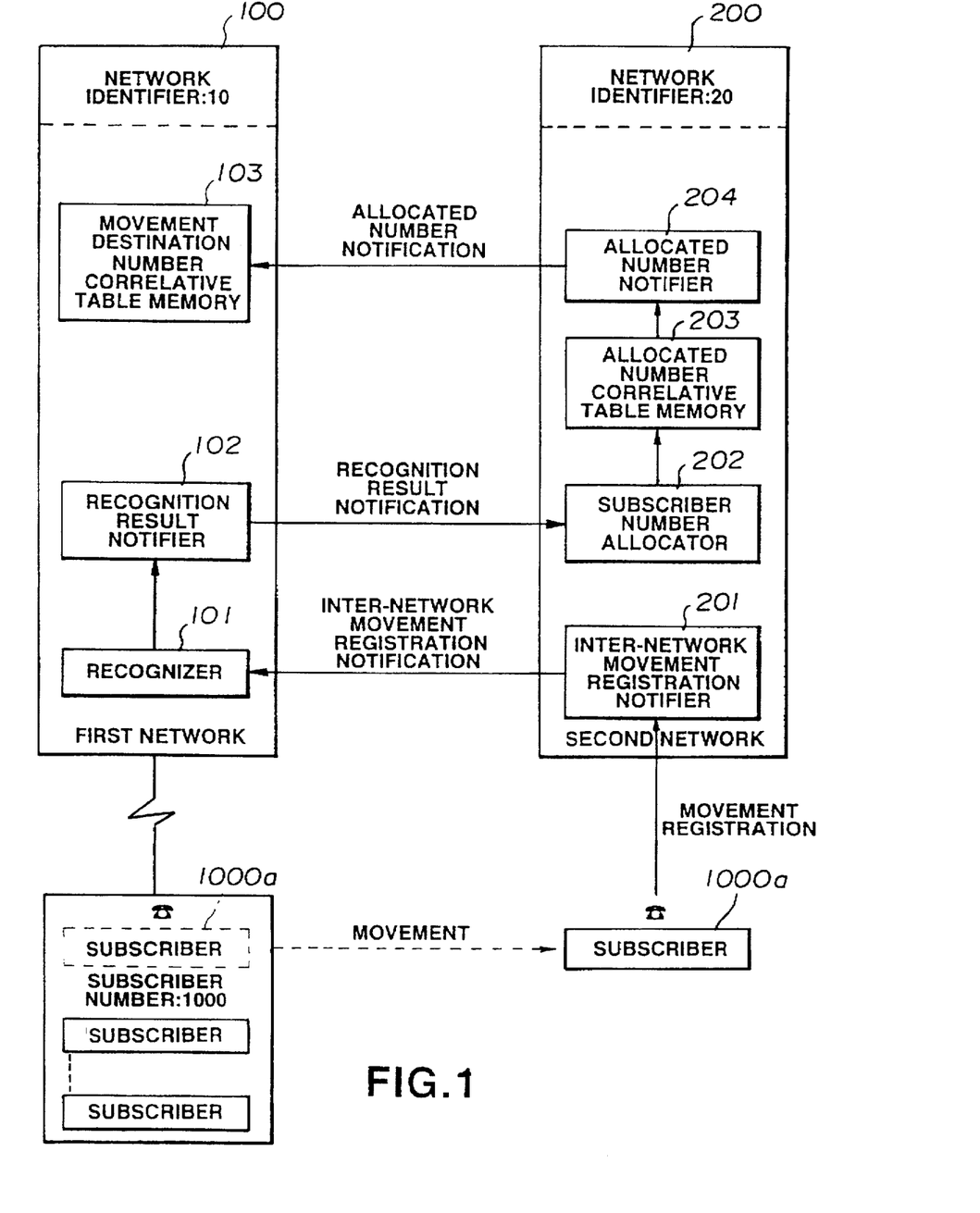
FIG. 1 is a functional block diagram of a communication system in accordance with an embodiment of the present invention.

Referring first to FIG. 1, there is shown a block diagram of a communication system in accordance with an embodiment of the present invention which includes a first network 100 and a second network 200 having different number plans.

The first network 100 has a network identifier set as '10' while the second network 200 has a network identifier set as '20'. FIG. 1 shows a case where a subscriber terminal 1000a having a subscriber number '1000' set according to the number plan of the first network 100 has moved to the second network 200.

In this case, the first network 100 as a movement originator network has a recognizer 101, a recognition result notifier 102 and a movement destination number correlative table memory 103 to be described in detail later.

Meanwhile, the second network 200 as a movement destination network has an inter-network movement registration notifier 201, a subscriber number allocator 202, an allocated number correlative table memory 203, and an allocated number notifier 204 to be described in detail later.

FIG. 1 shows essential functions of the respective first and second networks 100 and 200 of the present embodiment when the subscriber terminal moves from the first network 100 to the second network 200. When the subscriber terminal 1000a moves from the second network 200 to the first network 100, the first network 100 has the same functions as the second network 200 of FIG. 1 while the second network 200 has the same functions as the first network 100 of FIG. 1.

The subscriber terminal 1000a comprises, for example, a portable radio telephone set movable between the first and second networks 100 and 200.

When the subscriber terminal 1000a with the subscriber number '1000' set according to the number plan of the first network 100 moves to the second network 200, the subscriber terminal 1000a performs a movement registration over the second network 200.

Figure 2:
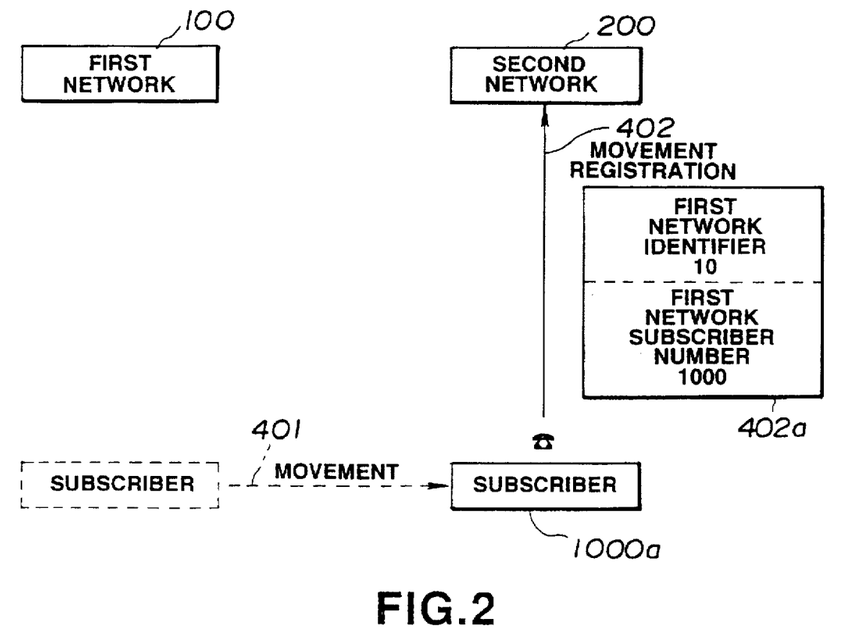
FIG. 2 is a diagram for explaining the movement registering operation in the embodiment of FIG. 1.

FIG. 2 shows the movement registration operation. More specifically, when the subscriber terminal 1000a moves to the second network 200 (step 401), the subscriber terminal 1000a first performs the movement registration over the second network 200 (step 402). This movement registration is carried out as shown by a block 402a in FIG. 2 by notifying the second network 200 of the network identifier '10' of the first network 100 as the movement originator network as well as of the subscriber number '1000' of the subscriber terminal 1000a in the first network 100.

The second network 200, when receiving a movement registration notification from the subscriber terminal 1000a, notifies the first network 100 of that effect.

Figure 3:
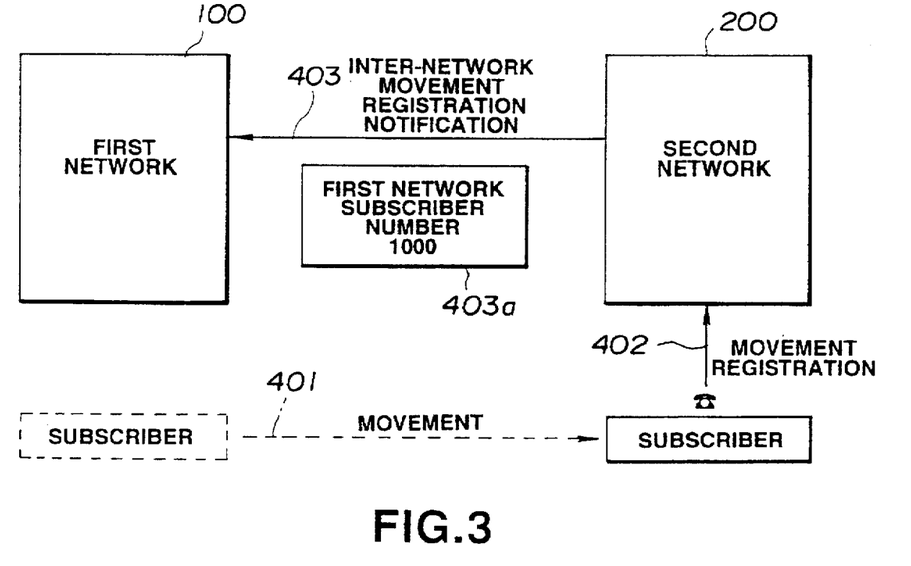
FIG. 3 is a diagram for explaining the inter-network movement registration notifying operation in the embodiment of FIG. 1.

FIG. 3 shows the notifying operation. More specifically, the second network 200, when receiving the movement registration notification from the subscriber terminal 1000a (step 402), performs an inter-network movement registration notification to the first network 100 (step 403). This inter-network movement registration notification is carried out as shown by a block 403a in FIG. 3 by notifying the first network 100 of the first network subscriber number '1000' of the subscriber terminal 1000a. The inter-network movement registration notification is carried out by the inter-network movement registration notifier 201 in FIG. 1.

Figure 4:
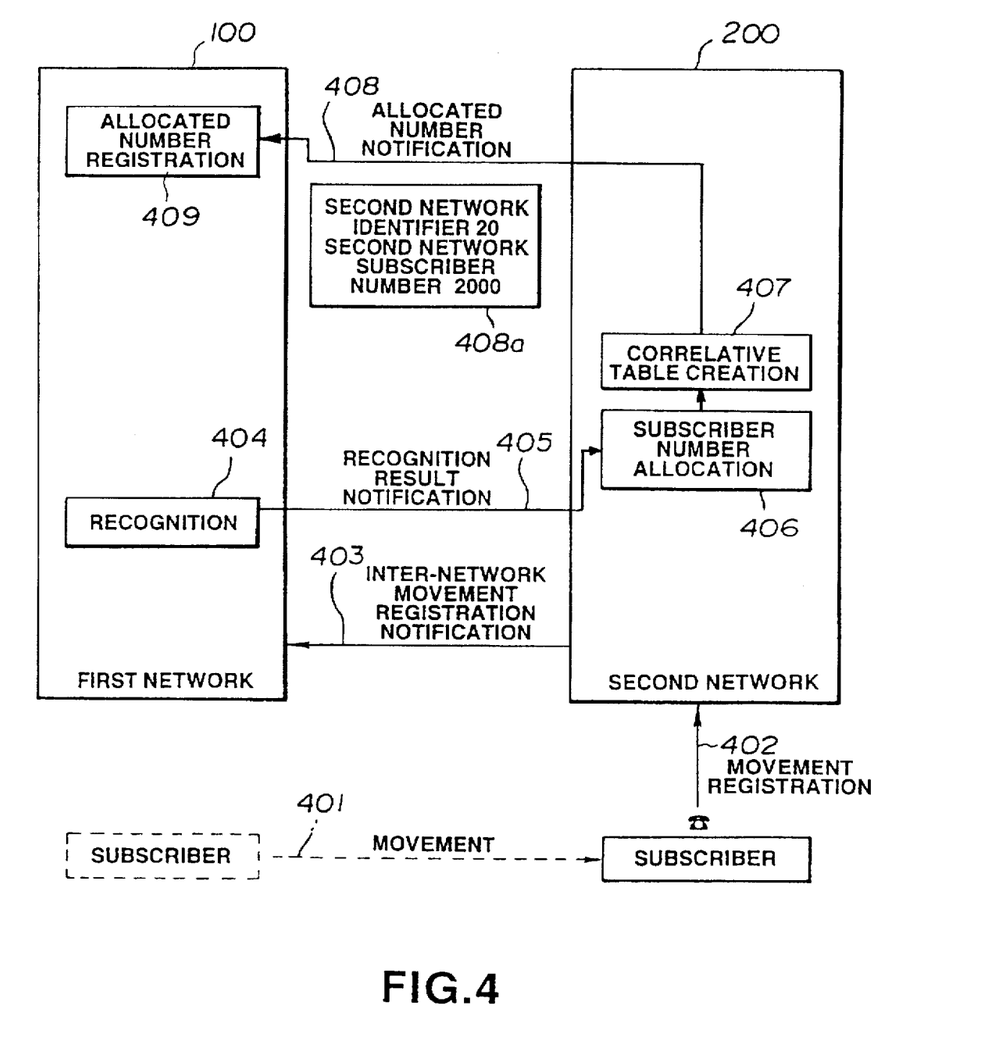
FIG. 4 is a diagram for explaining the processing operations of first and second networks and the data transmitting operation between the first and second networks in the embodiment of FIG. 1.

The first network 100, when receiving the inter-network movement registration notification from the second network 200, recognizes the inter-network movement registration notification on the basis of the first network subscriber number '1000' included in the inter-network movement registration notification, as shown in FIG. 4 (step 404). This recognition is carried out by the recognizer 101 in FIG. 1.

After completing the recognition, the first network 100 notifies the second network 200 of its recognition result. This notification is effected as a recognition result notification (step 405), which is carried out by the recognition result notifier 102.

The second network 200, when the recognition result of the recognition result notification is a movement registration approval, allocates a subscriber number in the second network 200 to the first network subscriber terminal 1000a (step 406). It is assumed in the illustrated embodiment that the second network 200 allocates a subscriber number '2000' in the second network 200 to the first network subscriber terminal 1000a. The allocation of the subscriber number in the second network 200 is carried out by the subscriber number allocator 202 in FIG. 1.

After completing the allocation of the subscriber number in the second network 200, the second network 200 creates a table (step 407) showing a correlation between the allocated subscriber number '2000' in the second network 200 and the network identifier '10' of the first network 100 as the movement originator network as well as the first network subscriber number '1000' of the subscriber terminal 1000a informed from the subscriber terminal 1000a at the time of the movement registration (step 402), and then stores the table in the second network 200. This processing is carried out by the allocated number correlative table memory 203 in FIG. 1.

Figure 5:
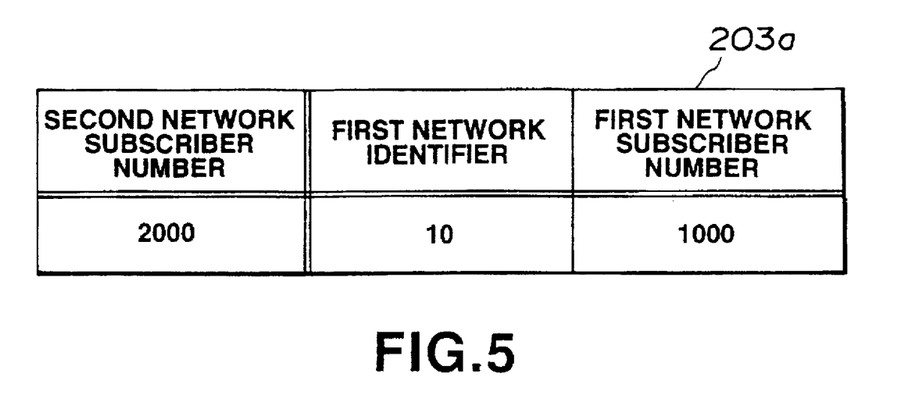
FIG. 5 is an exemplary allocated number correlative table in the embodiment of FIG. 1.

Shown in FIG. 5 is an example of the above mentioned table to be stored in the second network 200. In this case, as shown in FIG. 5, the first network identifier '10' and the first network subscriber number '1000' are stored in the allocated number correlative table 203a in association with the allocated second network subscriber number '2000'.

After completing the creation and storage of the allocated number correlative table, the second network 200 notifies the first network 100 of an allocated number including the second network identifier '20' and the second network subscriber number '2000', as shown by a block 408a in FIG. 4 (step 408). This allocated number notification is carried out by the allocated number notifier 204 in FIG. 1.

Figure 6:
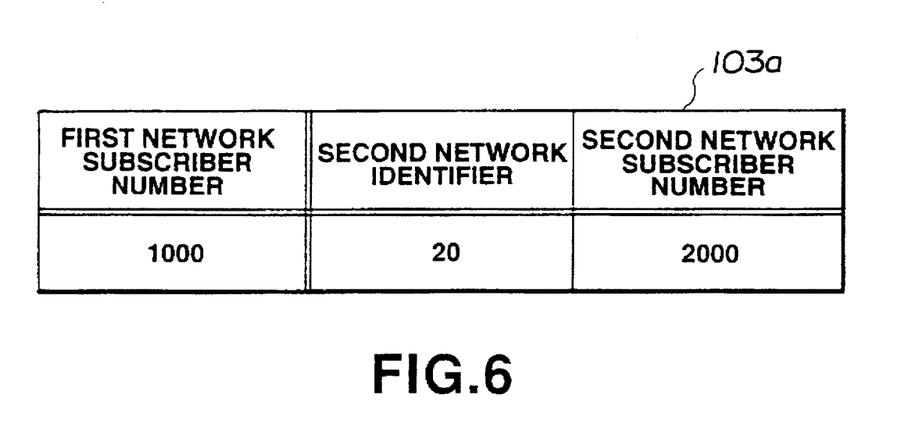
FIG. 6 is an exemplary moved-network number correlative table in the embodiment of FIG. 1.

The first network 100, when receiving the allocated number notification from the second network 200, registers the second network identifier '20' and the second network subscriber number '2000' included in the allocated number notification as a movement destination of the first network subscriber number '1000' (step 409), prepares such a movement destination number correlative table 103a as shown in FIG. 6, and then stores the table in the first network 100. This processing is carried out by the movement destination number correlative table memory 103 in FIG. 1.

In the movement destination number correlative table 103a of FIG. 6, the second network identifier '20' and the second network subscriber number '2000' are stored in association with the first network subscriber number '1000'.

Figure 7:
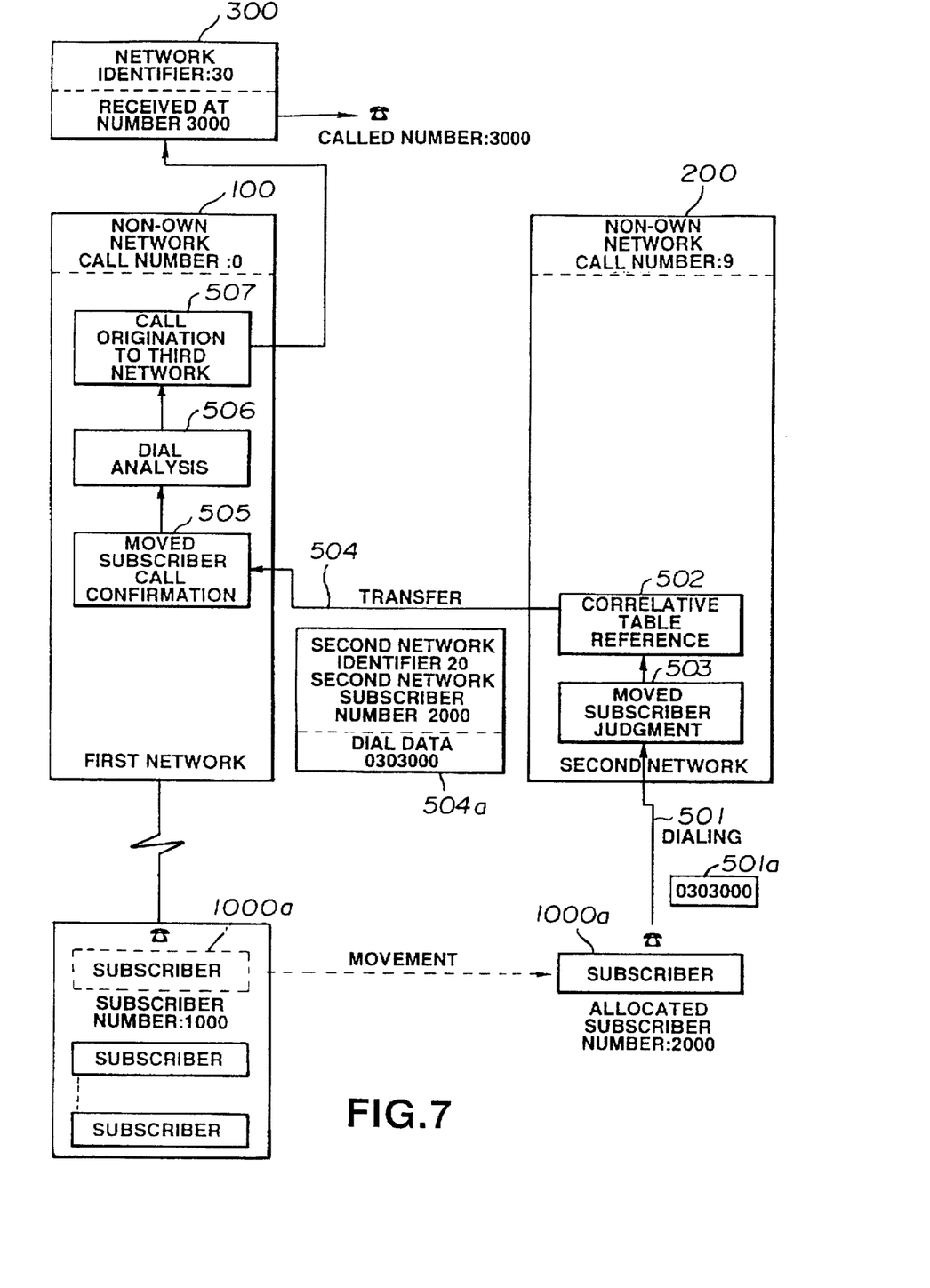
FIG. 7 shows a flow of signals when a subscriber moved to another network issues a call therefrom in the embodiment of FIG. 1.

FIG. 7 shows a flow of signals when the first network subscriber terminal 1000a moves to the second network 200 and performs the movement registration over the second network 200, and then the first network subscriber terminal 1000a located in the second network 200 calls a subscriber having a subscriber number '3000' in a third network 300 having an identifier '30'. In this case, the first network subscriber terminal 1000a located in the second network 200, dials a number '0' used for issuing a call from the first network 100 to another network, an identifier '30' of the third network and the subscriber number '3000' in the third network 300 sequentially, i.e., as '0303000' shown by a block 501a in FIG. 7, as similar to the manner when the subscriber terminal is located in the first network 100 (step 501).

In this case, the second network 200 judges by referring to the allocated number correlative table 203a of FIG. 5 (step 502) whether or not this call is from the moved subscriber terminal located in the other network (step 503). In the illustrated example, since the caller terminal, i.e., the subscriber terminal 1000a is the one moved to the second network 200 from the first network 100, the second network 200 extracts the second network subscriber number '2000' from the allocated number correlative table 203a, and transmits to the first network 100 the second network identifier '20' and the second network subscriber number '2000' as well as the dial data '0303000' informed from the caller as shown by a block 504a in FIG. 7 (step 504).

After referring to the movement destination number correlative table 103a of FIG. 6 and confirming on the basis of the second network identifier '20' and the second network subscriber number '2000' that the caller is the first network subscriber terminal 1000a moved to the second network 200 from the first network 100 (step 505), the first network 100 analyzes the dial data '0303000' transmitted from the second network 200 (step 506), and then transmits it to the third network 300 (step 507). The third network 300 in turn, on the basis of the call from the first network 100, receives the call at the subscriber number '3000'.

With such an arrangement, the subscriber terminal moved into the second network 200 can send a call to a subscriber belonging to the third network 300, in substantially the same manner as in a call issued from the first network 100, without making the subscriber terminal moved to the second network 200 utterly conscious of a number '9' used for issuing a call from the second network 200 to another network.

The foregoing embodiment has been given merely as a suitable example, and thus the present invention may be modified in various ways without departing from the gist of the invention. Thus, in the foregoing embodiment, although the above explanation has been made in connection with the call origination in which a call is issued to a network from another network which the caller terminal does not belong to, the present invention may be similarly applied even to a case where other services are received. Further, the number of networks in the communication system may be set at 3 or more. Even in this case, the moved subscriber terminal can receive the similar service to the movement originator network in any movement destination network so long as the moved subscriber terminal is subjected to the movement registration in the movement destination network, without making the subscriber terminal conscious of the number plan of the movement destination network.

What is claimed is:

1. A communication system comprising:
    a first and second network, each having a plurality of subscriber terminals accommodated therein and having respectively different number plans;
    each of the plurality of subscriber terminals accommodated in the first network, which issues a call to another network through the second network, the subscriber terminals including
        registration means for notifying the second network of an identifier of the first network and a subscriber number of the subscriber terminal in the first network to register the identifier and the subscriber number over the second network; the second network including
        subscriber number allocation means for allocating a subscriber number in the second network to the subscriber terminal in response to the registration by the registration means,
        allocated number correlative table memory means for preparing and storing therein an allocated number correlative table showing a correlation between the subscriber number in the second network with the identifier of the first network and the subscriber number in the first network, and
        allocated number notification means for notifying the first network of the subscriber number in the second network and an identifier of the second network; the first network including
        subscriber number correlative table memory means for preparing and storing therein a subscriber number correlative table showing a correlation between the subscriber number in the first network, the subscriber number in the second network and the identifier of the second network in response to the notification from the allocated number notification means; and
    wherein, when the subscriber terminal located in the second network issues a call, the second network transfers a call control to the first network according no the allocated number correlative table, while the first network performs the call control according to the subscriber number correlative table.

2. The system of claim 1, wherein the second network further includes
    inter-network registration notification means for notifying the first network of the registration and the subscriber number in the first network in response to the registration by the registration means,
    wherein the first network further includes
        recognition means, when receiving a notification from the inter-network registration notification means, for recognizing receipt of the notification, and
        recognition result notification means for notifying the second network of a recognition result of the recognition means, and
    wherein the subscriber number allocation means allocates the subscriber number in the second network to the subscriber terminal in response to the recognition result notification.

3. The system of claim 1, wherein the second network, when the subscriber terminal issues a call, transfers to the first network dial data entered by the subscriber terminal together with the identifier of the second network and the subscriber number in the second network by referring to the allocated number correlative table, and
    wherein the first network confirms whether the transferred subscriber number in the second network is the subscriber number allocated to the subscriber terminal by referring to the subscriber number correlative table, analyzes the transferred dial data and issues a call to a party corresponding to the dial data according to an analysis result.

4. A communication system comprising:

a first and second network, each having a plurality of subscriber terminals accommodated therein and having respectively different number plans;

each of the plurality of subscriber terminals accommodated in the first network, which issues a call to another network through the second network, the subscriber terminals including registration means for notifying the second network of an identifier of the first network and a subscriber number of the subscriber terminal in the first network to register the identifier and the subscriber number over the second network;

the second network including inter-network registration notification means for notifying the first network of the registration and the subscriber number in the first network in response to the registration by the registration means;

wherein the first network further includes recognition means, when receiving a notification from the inter-network registration notification means, for recognizing receipt of the notification, and recognition result notification means for notifying the second network a recognition result of the recognition means;

the second network including subscriber number allocation means for allocating a subscriber number in the second network to the subscriber terminal in response to the recognition result notification from the recognition result notification means, allocated number correlative table memory means for preparing and storing therein an allocated number correlative table showing a correlation between the subscriber number in the second network with the identifier of the first network and the subscriber number in the first network, and allocated number notification means for notifying the first network of the subscriber number in the second network and an identifier of the second network;

the first network including subscriber number correlative table memory means for preparing and storing therein a subscriber number correlative table showing a correlation between the subscriber number in the first network, the subscriber number in the second network and the identifier of take second network in response to the notification from the allocated number notification means; and wherein, when the subscriber terminal located in the second network issues a call, the second network transfers a call control to the first network according to the allocated number correlative table, while the first network performs the call control according to the subscriber number correlative table.

5. The system of claim 4, wherein the second network, when the subscriber terminal issues a call, discriminates the first network of the subscriber terminal and transfers to the discriminated first network dial data entered by the subscriber terminal together with the identifier of the second network and the subscriber number in the second network, by referring to the allocated number correlative table, wherein the first network confirms whether the transferred subscriber number in the second network is the subscriber number allocated to the subscriber terminal by referring to the subscriber number correlative table, analyzes the transferred dial data and issues a call to a party corresponding to the dial data according to an analysis result.

6. A communication system comprising:

a first and second network, each having a plurality of subscriber terminals accommodated therein and having respectively different number plans, each of the plurality of subscriber terminals, accommodated in the first network, which issues a call to another network through the second network, the subscriber terminals including registration means for notifying the second network of an identifier of the first network and a subscriber number of the subscriber terminal in the first network to register the identifier and the subscriber number over the second network;

the second network including subscriber number allocation means for allocating a subscriber number in the second network to the subscriber terminal in response to the registration by the registration means, allocated number correlative table memory means for preparing and storing therein an allocated number correlative table showing a correlation between the subscriber number in the second network with the identifier of the first network and the subscriber number in the first network, and allocated number notification means for notifying the first network of the subscriber number in the second network and an identifier of the second network;

the first network including subscriber number correlative table memory means for preparing and storing therein a subscriber number correlative table showing a correlation between the subscriber number in the first network, the subscriber number in the second network and the identifier of the second network in response to the notification from the allocated number notification means;

wherein the secured network, when the subscriber terminal issues a call, discriminates the first network of the subscriber terminal and transfers to the discriminated first network dial data entered by the subscriber terminal together with the identifier of the second network and the subscriber number in the second network, by referring to the allocated number correlative table; and wherein the first network confirms whether the transferred subscriber number in the second network is the subscriber number allocated to the subscriber terminal by referring to the subscriber number correlative table, analyzes the transferred dial data and issues a call to a party corresponding to the dial data according to an analysis result.

7. A communication system comprising:

a first and second network, each having a plurality of subscriber terminals accommodated therein and having respectively different number plans;

each of the plurality of subscriber terminals, accommodated in the first network, which issue a call to another network through the second network, the subscriber terminals including registration means for notifying the second network of an identifier of the first network and a subscriber number of the subscriber terminal in the first network to register the identifier and the subscriber number over the second network;

the second network including inter-network registration notification means for notifying the first network of the registration and the subscriber number in the first network in response to the registration by the registration means;

the first network including recognition means, when receiving notification from the inter-network registration notification means, for recognition the notification, and recognition result notification means for notifying the second network of a recognition result of the recognition means;

the second network including subscriber number allocation means for allocating a subscriber number in the second network to the subscriber terminal in response to the recognition result notification from the recognition result notification means, allocated number correlative table memory means for preparing and storing therein an allocated number correlative table showing a correlation between the subscriber number in the second network with the identifier of the first network and the subscriber number in the first network, and allocated number notification means for notifying the first network of the subscriber number in the second network and an identifier of the second network; the first network including subscriber number correlative table memory means for preparing and storing therein a subscriber number correlative table showing a correlation between subscriber number in the first network, the subscriber number in the second network and the identifier of the second network in response to the notification from the allocated number notification means;

wherein the second network, when the subscriber terminal issues a call, discriminates the first network of the subscriber terminal and transfers to the discriminated first network dial data entered by the subscriber terminal together with the identifier of the second network and the subscriber number in the second network by referring to the allocated number correlative table; and wherein the first network confirms whether the transferred subscriber number in the second network is the subscriber number allocated to the subscriber terminal by referring to the subscriber number correlative table, analyzes the transferred dial data and issues a call to a party corresponding to the dial data according to an analysis result.

8. A communication system, comprising:

a plurality of networks including an originating network and a destination network, said originating and destination network having different number plans for communicating with respective subscriber terminals, each said subscriber terminal operable to generate and transmit a movement registration signal identifying an identifier of the originating network and an originating network subscriber terminal number to the destination network, in response to movement of said originating network subscriber terminal from an originating network coverage area to a destination network coverage area upon issuance of a call;

notification means at said destination network responsive to the movement registration signal for notifying the originating network that the originating network subscriber terminal is located within the destination network coverage area;

recognition means at said originating network responsive to the notification by the notification means for recognizing and approving the movement registration of the originating network subscriber terminal to the destination network;

allocation means at the destination network responsive to the registration approval by the originating network for allocating and transmitting a destination network subscriber number to the originating network; and correlation means at the originating network responsive to the allocation means for storing and correlating the originating network subscriber number with an identifier of the destination network to control the issued call.

9. The communication system of claim 8, wherein the movement registration signal includes the identifier of the originating network, and the originating network subscriber terminal number.

10. The communication system of claim 8, wherein the notification means includes movement notification means at said destination network responsive to the movement registration signal for generating and transmitting to the originating network a movement notification signal notifying the originating network of the subscriber number of the originating network terminal located within the destination network coverage area.

11. The communication system of claim 10, wherein the movement notification signal includes the originating network subscriber terminal number.

12. The communication system of claim 10, wherein the recognition means includes a recognizer at the originating network to receive the generated movement notification signal transmitted by the movement notification means.

13. The communication system of claim 12, wherein the recognition means further includes recognition result notification means at the originating network responsive to the movement notification signal for generating and transmitting to the destination network a recognition result notification signal approving the movement registration of the originating network subscriber terminal to the destination network.

14. The communication system of claim 13, wherein the allocation means includes subscriber number allocation means at the destination network responsive to the approval of the movement registration for allocating a destination network subscriber number to the originating network subscriber terminal located within the destination network coverage area.

15. The communication system of claim 14, wherein the allocation means includes correlative table memory means at the destination network for storing and correlating the subscriber number, allocated by the subscriber number allocation means at said destination network, with the corresponding originating network identifier and the originating network subscriber terminal number.

16. The communication system of claim 15, wherein the allocation means includes allocated number notification means at the destination network for transmitting the allocated number to the originating network notifying the originating network of the destination network number and the allocated destination network subscriber number.

17. The communication system of claim 16, wherein the allocated number is transmitted in a signal including the identifier of the destination network, and the destination network subscriber terminal number.

18. The communication system of claim 16, wherein the correlation means includes destination table memory means at the originating network responsive to the allocated number signal transmitted by the destination network for storing and correlating the originating network subscriber number with the corresponding destination network identifier and the allocated destination network subscriber number to control the issued call.

19. A method of establishing a communication link between subscriber terminals of a plurality of networks having different number plans, the method comprising the steps of:

generating and transmitting a first signal identifying an identifier of an originating network and an originating network subscriber terminal number in response to movement of an originating network subscriber terminal from an originating network coverage area to a destination network coverage area;

generating and transmitting a second signal notifying the originating network that the originating network subscriber terminal is located within the destination network coverage area;

receiving at the originating network the second signal;

generating and transmitting to the destination network a third signal approving the movement registration of the originating network subscriber terminal to the destination network;

allocating a destination network subscriber number to the originating network subscriber terminal;

storing and correlating the allocated destination network subscriber number with the originating network identifier and the originating network subscriber number;

generation and transmitting a fourth signal to the originating network notifying the originating network of an identifier of the destination network and the allocated destination network subscriber number;

storing and correlating the originating network subscriber number with the destination network identifier and the allocated destination network subscriber number in a correlative table memory;

determining the location of the originating network subscriber terminal in response to an issuance of a call to another one of the plurality of networks in accordance with the correlative table memory;

transferring corresponding data of the correlative table memory to the originating network in response to a determination that the originating network subscriber terminal issuing a call is located within the coverage area of the destination network;

verifying that the transferred data matches the data stored in a movement destination table memory of the originating network; arid issuing a call by the originating network to said one of the plurality of networks in response to a verification of a data match.

20. The communication method of claim 19, wherein the first signal includes the identifier of the originating network, and the originating network subscriber terminal number.

21. The communication method of claim 19, wherein the second signal includes the originating network subscriber terminal number.

22. The communication method of claim 19, wherein the fourth signal includes the identifier of the destination network, and the destination network subscriber terminal number.

* * * * *

UNITED STATES PATENT AND TRADEMARK OFFICE
CERTIFICATE OF CORRECTION

PATENT NO. : 5,689,554
DATED : November 18, 1997
INVENTOR(S) : Shigeru FUKAZAWA et al.

It is certified that error appears in the above-indentified patent and that said Letters Patent is hereby corrected as shown below:

Claim 1, column 6, line 33, "no" should read --to--.

Claim 4, column 7, line 47, "take" should read --the--.

Claim 7, column 8, line 57, "issue" should read --issues--.

Claim 7, column 9, line 6, "recognition" should read --recognizing--.

Claim 7, column 9, line 28, after "between", insert --the--.

Claim 19, column 12, line 1, "generation" should read --generating--.

UNITED STATES PATENT AND TRADEMARK OFFICE
CERTIFICATE OF CORRECTION

PATENT NO. : 5,689,554
DATED : November 18, 1997
INVENTOR(S) : Shigeru FUKAZAWA et al.

It is certified that error appears in the above-indentified patent and that said Letters Patent is hereby corrected as shown below:

Claim 19, column 12, line 20, "arid" should read --and--.

Signed and Sealed this

Seventh Day of July, 1998

Attest:

BRUCE LEHMAN

Attesting Officer

Commissioner of Patents and Trademarks